Oct. 27, 1936.　　C. G. RICHARDSON　　2,059,145
TELEMETRIC PROPORTIONING CONTROLLER
Filed June 2, 1934
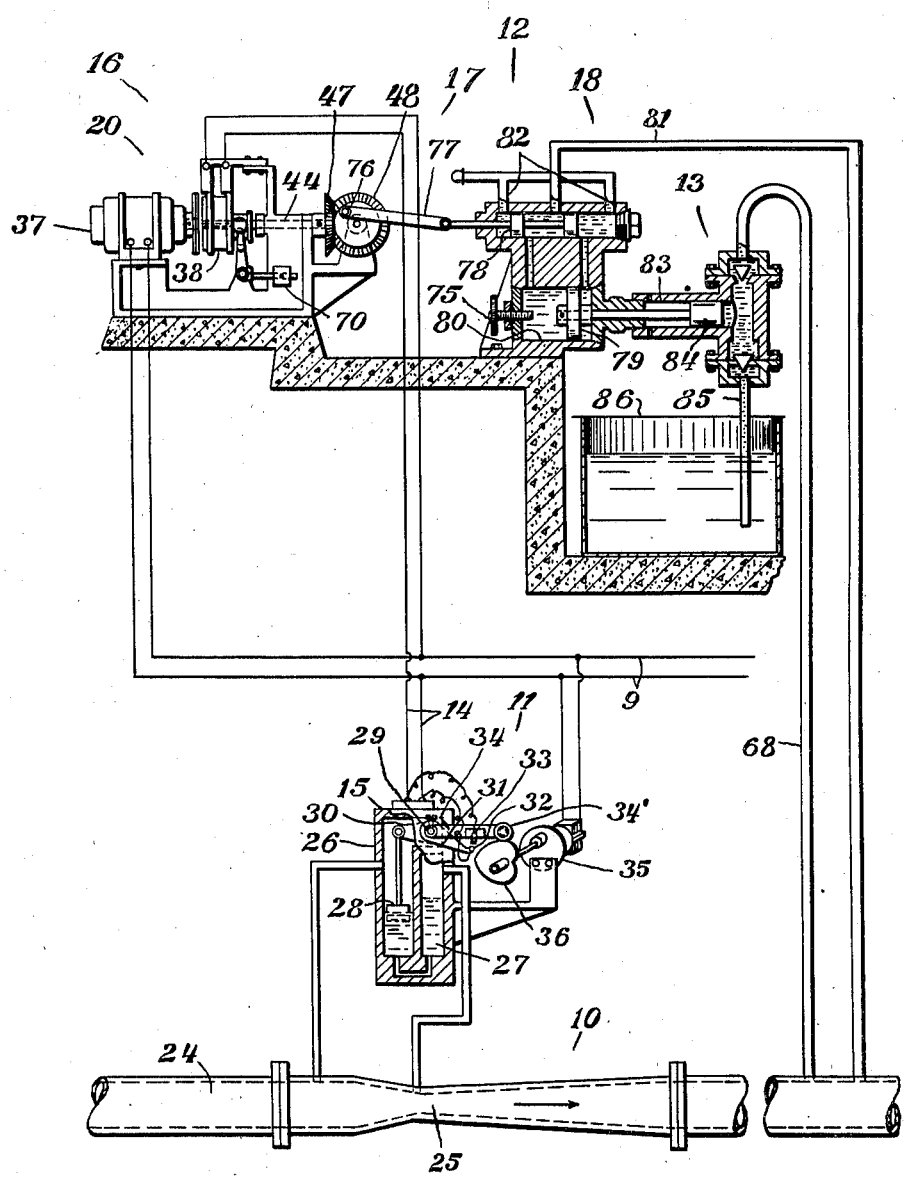
INVENTOR
CHARLES G. RICHARDSON
BY Maxwell Barns
ATTORNEY Patented Oct. 27, 1936

2,059,145

UNITED STATES PATENT OFFICE 2,059,145

TELEMETRIC PROPORTIONING CONTROLLER

Charles G. Richardson, Providence, R. I., assignor to Builders Iron Foundry, Providence, R. I., a corporation of Rhode Island Application June 2, 1934, Serial No. 728,655

17 Claims. (Cl. 137—165)

My invention relates to improvements in proportioning controllers where one quantity is telemetrically controlled in correspondence with another quantity. My invention is particularly applicable where the master quantity is a fluid flowing in a conduit and the dependent quantity is another substance, whether a dry solid, a liquid, a vapor, or a gas.

One object of my invention is to provide means for telemetrically governing the proportioning in a predetermined ratio with high accuracy by means of signals that are a function of time, so that the master and dependent quantities need not be near each other—a requirement that, in practice, often eliminates other proportioning controllers.

A further feature of my invention is to provide such a telemetrically operated controller with an integrator-type receiver for maintaining the average rate of the dependent quantity in a predetermined proportion to that of the master quantity.

A specific object of my invention is to displace a member in such integrator-type of telemetric receiver through extents proportional to the time durations signalled to such a receiver and to provide means controlled thereby for feeding an amount of chemical, whether in solid, liquid, or gaseous form, in proportion to the rate of the master quantity.

A further specific object of my invention is to telemeter the flow of a master quantity of fluid to a receiver by means of signals using a function of time so that the receiver controls the mean rate of injecting a dependent quantity into the master fluid, preferably by means of a pump having its frequency or length of strokes controlled by said receiver. See copending application, Serial No. 728,654, filed June 2, 1934, on Non-telemetric proportioning controller to same assignee as present application.

An object of my invention broadly is to cyclically control a pump to produce flow of fluid in one line in proportion to the flow of fluid in another line by means positionable in response to time-duration, telemetric signalling impulses. These and such other features of my invention as may hereinafter appear will be best understood from a description of the preferred embodiment thereof, such as is illustrated in the accompanying drawing.

The drawing shows a diagrammatic elevation, partially shown in section and partially shown in perspective, of the preferred embodiment of my invention adapted to inject a chemical solution into a pressure line at a mean rate proportional to that in a pressure main as telemetered by means of time signals to the receiver governing the rate of injection.

In the drawing, like characters of reference indicate like parts throughout: 10 metering means responsive to a master quantity, 11 telemetering means broadly for said quantity making use of a function of time, 12 governing means actuatable by said telemetric means to control a dependent quantity by its actuating means 13 broadly shown. The telemetering means 11 consists of telemetric circuit means 14, transmitter means 15 actuated by said metering means 10 for metering said master quantity to produce signalling impulses in the circuit means 14 of a time duration corresponding to the rate of the master quantity metering and 16 broadly telemetric receiver means connected to circuit 14 and cyclically responsive to said signal durations and hence corresponding to the quantity metered. Substantially synchronous motors 35 and 37 are preferably attached to a common A. C. supply 9 having the same regulated frequency at both transmitter and receiver to give the utmost accuracy of telemetering.

The governing means 12 broadly consists of means 17 operatively connecting the telemetric receiver means 16, responsive to the master quantity, with metering means 18 broadly for said dependent quantity including pumping means 13. The form of metering means and control means for the different rates may vary in different embodiments. The telemetric receiver means may either comprise integrator-type means 20, or braked indicator-type means as in U. S. Patent Re. 19,039 to Wilde.

The master quantity, e. g. water, flows through conduit 24 including a Venturi tube 25 for creating a pressure differential responsive to its flow rate. Telemetric transmitter 15 is connected to the Venturi tube 25. Transmitter 15 has a U-tube 26 containing mercury 27. Float 28 is positioned by the mercury surface in one leg of U-tube 26 in response to the pressure differential produced by the flow through Venturi tube 25. This float 28 correspondingly positions arms 30 and 31 and shaft 29 to which they are affixed. Shaft 29 passes through a stuffing box since arm 30 is under conduit fluid pressure and arm 31 is under atmospheric pressure. Synchronous motor 35 rotates cam 36 continuously to cyclically raise and lower arm 34 by means of a roller 34' attached to its outer end. Arm 34 is free to rotate on shaft 29 and carries contact 33 adapted to rest on contact 32 carried by arm 31 when permitted by the coaction of cam 36 with roller 34'. Contacts 32 and 33 are attached to telemetric circuit 14 to connect it with supply circuit 9 to produce signalling impulses in circuit 14.

Receiver 16 has constant-speed motor 37 continuously rotating one face of clutch 38. Circuit 14 is connected to the other electromagnetically-operated face of this clutch 38 so that it engages for the durations of the signals in circuit 14. Weight 70 disengages the clutch as soon as the signalling current ceases. Splined shaft 44 is driven by clutch 38 slidably mounted thereon, bevel gear 47 being attached to its other end. Bevel gear 47 drives bevel gear 48 and crank 76 attached thereto. Connecting rod 77 therefor is connected to pilot valve piston 78 to reciprocate it. Hydraulic power piston 79 in its cylinder 80 is controlled in its stroking by pilot valve piston 78, its length of stroke being determined by the position of adjustable screw stop 75. Supply line 81 for the pilot is preferably connected with conduit 24 when the master fluid is water. However any other suitable source of auxiliary power may be used instead. Waste ports 82 are provided for the pilot valve. Pumping cylinder 83 has its piston 84 attached to the piston 79 of the power cylinder 80 and is adapted to draw a definite amount of fluid, in each stroke, through suction line 85 from supply tank 86 and discharge it through the injection line 68 into the conduit 24 under pressure.

The operation is as follows: The water flows through conduit 24 and Venturi tube 25 where it creates a pressure differential corresponding with its rate of flow. This displaces the mercury 27 and float 28 in U-tube 26 to correspondingly position contact 32. Contact 33 on arm 34 is raised and lowered by continuously rotating cam 36. Thus the weight of the arm 34 causes the upper contact 33 thereon to rest on the lower contact 32 on arm 31 for a period of time that depends on the rate of flow of the fluid through the Venturi tube 25. This completes the telemetric circuit 14 and causes a signalling current to flow for the time duration that these contacts 32 and 33 coact. At the receiver 16 the magnetic clutch 38, normally held in inoperative position by the counterweight 70, then engages synchronous motor drive 37 for the duration of the signals.

The electro-magnetic clutch 38 thus drives bevel gears 47 and 48 to turn crank 76 and reciprocate pilot valve piston 78 by means of connecting rod 77. For each complete, or integral, revolution of gear 48, the pilot valve piston moves through one complete cycle so that fluid under pressure from line 81 is introduced first on one side and then on the other side of motor piston 79 in cylinder 80 so that it also moves through one complete stroking cycle. Pumping piston 84 is correspondingly reciprocated through one complete stroking cycle since it is directly attached to motor piston 79. Since the area of piston 84 is less than that of piston 79 it is obvious that the pump will create a greater pressure in line 68 attached to it than in pressure line 81. In each cycle, pumping piston 84 thus draws a definite amount of reagent from supply tank 86 and discharges it through injection line 68 into the conduit 24 under pressure.

The ratio of gearing 47 and 48 may be altered to take care of wide changes in the rate of injecting chemical. Screw stop 75 may be adjusted to set the length of stroke of the pump piston 84 to alter the ratio of fluid injected through line 68 to that in the conduit 24 for accommodating moderate changes. Also, in some cases, the fluid in tank 86 may be diluted to change the proportion of its effective constituent, or reagent, although this cannot be done in all cases since the liquid in tank 86 may be required to be a saturated solution. It is thus obvious that I have provided means for feeding a reagent into a line containing a fluid, under pressure, in a predetermined proportion to said fluid.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetric proportioning system, the combination of means for telemetering the rate of delivery of a substance by signals of a function of time corresponding therewith, a pump for a second substance, and means governed by said telemetering means for actuating said pump for extents corresponding with said signals.

2. In a telemetric proportioning system, the combination of means for telemetering the rate of delivery of a substance by signals of a function of time corresponding therewith, means for pumping a fluid substance, and means governed by said telemetering means for controlling the actuation of said pumping means to pump amounts of said fluid substance corresponding with said signals.

3. In a telemetric proportioning system, the combination of means for telemetering the rate of delivery of a substance by a signal of a duration corresponding therewith, means for actuating a second substance, and means adapted to be governed by said telemetering means for controlling the actuation of said actuating means for an extent corresponding with signal duration.

4. In a telemetric proportioning system, the combination of telemetric receiver means having a portion cyclically movable for extents corresponding with the telemetered rate of delivery of a master substance, pumping means for a dependent fluid substance, and means connected to said telemetric receiver movable portion and to said pumping means and adapted to control the actuation of said pumping means for extents corresponding with said movable portions extents.

5. In a telemetric proportioning system, the combination of integrator-type telemetric receiver means having a portion cyclically and progressively movable for extents corresponding with the telemetered rate of delivery of a substance; pumping means for a second substance; and means, connected to said telemetric receiver movable portion and to said pumping means, adapted to control the actuation of said pumping means through an extent corresponding with said integrated movements of said receiver movable means.

6. In a telemetric proportioning system, the combination of a telemetric receiver having a portion cyclically movable for extents corresponding with the rate of delivery of a substance, means movable by predetermined definite amounts, and means connecting said receiver cyclically movable portion with said means movable by definite amounts for controlling the number of movements thereof.

7. In a telemetric proportioning system, the combination of a telemetric receiver having a portion cyclically movable at substantially constant speed for durations and extents corresponding with the rate of delivery of a substance, means movable by predetermined definite amounts corresponding with the rate of delivery of a second substance, and means connecting said receiver cyclically movable portion with said means movable by definite amounts for controlling the number of movements thereof.

8. In a telemetric proportioning system as set forth in claim 7, said movable means including adjustable means for predetermining said definite amounts of movement thereof.

9. In a telemetric proportioning system for a master and a dependent fluid quantity, the combination of conduit means for conveying said master fluid quantity; means for cyclically telemetering said quantity comprising operatively connected transmitting, circuit and receiving means; said transmitting means comprising means attached to said conduit and adapted to produce a pressure differential corresponding to the flow rate of said master quantity, means connected to said differential pressure producing means and having a portion positionable in accordance with said pressure differential, said positionable portion having means operatively attached thereto and connected to said circuit to create therein in each cycle a continuous signal of duration corresponding with said master quantity flow rate; and said receiver having means movable from its initial position in each cycle for an extent corresponding to said signal duration; and pilot means, connected to said receiver cyclically movable means, adapted to be actuated thereby a number of times per unit of time corresponding to the average extent of cyclical movement thereof; means for pumping a second quantity into said conduit; and driving means for said pumping means controlled by said pilot means to move said pumping means a predetermined amount for each integral actuation of said pilot means.

10. In a telemetric proportioning system as set forth in claim 9, said driving means comprising reciprocating means displaceable by said master fluid master pressure from said conduit and controlled in its reciprocations by said pilot means, said pilot means comprising a valve.

11. In a telemetric proportioning system for master and dependent fluid quantities, the combination of a conduit for conveying said master fluid; means for cyclically telemetering said quantity comprising an operatively connected transmitting, circuit and receiving means; said transmitting means comprising a Venturi tube attached to said conduit, differential responsive means attached thereto comprising means for cyclically producing in said circuit a continuous signal corresponding in duration with the then flow rate of said master fluid; and said receiver comprising means movable at substantially constant speed for said signal duration in each cycle; a piston-and-cylinder means; a pressure fluid supply therefor; a pilot valve connected to said receiver movable means connecting said fluid supply to said piston-and-cylinder means and adapted to reciprocatably operate said means upon being actuated by said receiver movable means; a supply for said dependent fluid; and pump means connected to said dependent fluid supply and to said conduit and having a displacer means operatively connected to said piston-and-cylinder means to pump a quantity of said dependent fluid proportional to the quantity of said master fluid.

12. In a telemetric proportioning system for a master and a dependent fluid quantity, the combination of conduit means for conveying said master fluid quantity; means for cyclically telemetering said quantity comprising operatively connected transmitting, circuit and receiving means; said transmitting means comprising means attached to said conduit and adapted to produce a pressure differential corresponding to the flow rate of said master quantity, means connected to said differential pressure producing means and having a portion responsive to said pressure differential, said positionable portion having means operatively attached thereto and connected to said circuit to create therein in each cycle a continuous signal of duration corresponding with said master quantity flow rate; and said receiver having means movable from its initial position in each cycle for an extent corresponding to said signal duration; and pilot means, connected to said receiver cyclically movable means, adapted to be actuated thereby a number of times per unit of time corresponding to the average extent of cyclical movement thereof; means for actuating a second quantity; and means for controlling said actuating means governed by said pilot means to move said actuating means a predetermined amount for each integral actuation of said pilot means.

13. In a telemetric proportioning system, the combination of a telemetric receiver having a portion cyclically movable for extents corresponding with the rate of delivery of a substance, means movable to displace predetermined volumes of a second substance, and means connecting said receiver cyclically movable portion with said means movable to displace definite volumes for controlling the number of movements thereof.

14. In a telemetric proportioning system, the combination of a telemetric receiver having a portion cyclically movable at substantially constant speed for durations and extents corresponding with the rate of delivery of a substance, means movable to displace predetermined definite volumes of a second substance, and means connecting said receiver cyclically movable portion with said means movable to displace definite volumes for controlling the number of movements thereof.

15. In a telemetric proportioning system as set forth in claim 14, said movable means including adjustable means for predetermining said definite amount of displacement for each complete movement thereof.

16. In a telemetric system for proportioning one substance to another, the combination of means controlled by one of said substances for cyclically telemetering at regular intervals signals of a function of time corresponding with a quantity of said substance, a pump for the second substance, and means governed by said telemetering means for actuating said pump for extents corresponding with said signals.

17. In a telemetric system for proportioning one substance to another, the combination of means controlled by one of said substances for cyclically telemetering at regular intervals signals of time duration corresponding with a quantity of said substance, a pump for the second substance, and means governed by said telemetering means for actuating said pump for extents corresponding to said signals.

CHARLES G. RICHARDSON.